United States Patent [19]

Havens

[11] Patent Number: 4,868,544

[45] Date of Patent: Sep. 19, 1989

[54] SHOPPING CART RETRIEVAL SYSTEM

[76] Inventor: Rex Havens, 6846-16 Caminito Montanoso, San Diego, Calif. 92119

[21] Appl. No.: 212,578

[22] Filed: Jun. 28, 1988

[51] Int. Cl.$^4$ .............................................. G08B 13/14
[52] U.S. Cl. ..................... 340/572; 340/539; 340/568; 340/571; 340/573; 455/99; 194/905; 180/167; 200/61.85; 280/DIG. 4; 280/288.4; 186/62
[58] Field of Search ............... 340/568, 571, 572, 539, 340/531, 573; 186/26, 27, 31, 45, 62; 455/95, 97, 99, 100; 194/212, 905; 180/167, 1 B; 200/61.85; 280/242 R, 289 H, 645, 651, 659, 47.17, DIG. 3, DIG. 4

[56] References Cited

U.S. PATENT DOCUMENTS

| | | | |
|---|---|---|---|
| 3,157,871 | 11/1964 | Umanoff ............................ | 340/539 |
| 3,270,564 | 9/1966 | Evans .................................. | 340/539 |
| 4,071,740 | 1/1978 | Gogulski ............................ | 235/431 |
| 4,606,073 | 8/1986 | Moore ................................. | 455/100 |
| 4,689,611 | 8/1987 | Franklin ............................. | 340/539 |
| 4,772,880 | 9/1988 | Goldstein et al. ................. | 340/571 |

Primary Examiner—Donnie L. Crosland
Attorney, Agent, or Firm—Charles C. Logan, II

[57] ABSTRACT

The shopping cart retrieval system has been designed to allow search teams to detect and recover stolen or misplaced shopping carts. It consists of two distinct units of electronic equipment integrated together to form a retrieval system. The heart of the system is a VHF "beacon" radio transmitter implanted in the handle of the shopping cart which is continuously emitting a signal when it leaves the store. A search team, assigned the task of locating and recovering shopping carts, is equipped with a VHF radio receiver with both omnidirectional antenna for detection of a shoping cart at maximum range, and a directional antenna used for the close-in location process.

9 Claims, 2 Drawing Sheets

SHOPPING CART RETRIEVAL SYSTEM

BACKGROUND OF THE INVENTION

The invention relates to shopping carts and more specifically to a system designed to allow search teams to detect and recover stolen or misplaced shopping carts.

Presently grocery stores and other stores having shopping carts are experiencing a substantial monetary loss due to stolen and misplaced shopping carts. Most of these carts are taken by patrons who use them as a convenience in carting their merchandise to their homes. Many times these carts are then discarded or left at a distant location from the store. Some stores send employees out to retrieve shopping carts if someone telephones giving the location of their shopping carts. Some stores pay a reward for abandoned or misplaced shopping carts that are returned to their store. The ultimate loser, is the consumer since the price of his groceries or goods are increased to cover the cost of replacing the lost carts.

An additional problem that exists relates to organized theft rings that may steal as many as a hunhdred or more shopping carts at a time. These theft rings then sell the stolen carts to independent markets for appoximately $50.00 each.

It is an object of the invention to provide a novel shopping cart retrieval system that will allow the store to easily find shopping carts that have been taken from their premises.

It is also an object of the invention to provide a novel shopping cart retrieval system that would require minimal changes to existing shopping cart structure.

It is an additional object of the invention to provide a novel shopping cart retrieval system that is economical to manufacture and market.

It is a further object of the invention to provide a novel shopping cart retrieval system that can be supplied as OEM equipment or it can be retrofit to existing shopping carts.

SUMMARY OF THE INVENTION

Applicants' novel shopping cart retrieval system consists of two distinct units of electronic equipment integrated to form the retrieval system. The heart of the system is a VHF "beacon" radio transmitter that emits a continuous signal when it leaves the store. The other component of the system is the radio receiver for detecting the signal emitted from the transmitter.

The VHF "beacon" radio transmitter would preferably be mounted in the handle of the shopping cart. It is understood that a housing for the radio transmitter could also be mounted elsewhere on the frame of the shopping cart to function in the desired manner. The radio beacon transmitter operates in the VHF range and the transmitter is modulated by a pulsating signal of short duty cylcle and a slow repetition rate. Typically, the transmitter's pulsing power is at a rate of about three to five pulses per second. The length of each pulse is typically about four milliseconds or less. The reason for this duty cycle is to conserve battery power for maximum longivity. Furthermore, the rate of three to five pulses per second is deemed to be best for detection by search teams in the field and yet conserve power.

The radio beacon transmitter as mounted in the handle of the shopping cart is activated by removing a plastic clip-on collar with a magnet on it and this results in the magnetic switch inside the handle closing its circuit and thus the transmitter emits a continuous signal until the magnet is snapped back on the handle. Thus as the shopping cart leaves the store it continues to emit a trackable signal.

The search teams are equipped with a conventional scanning VHF receiver, an omni-directional antenna which is typically fixed to the search vehicle, and a portable directional antenna. Applicants' present VHF system presently uses a conventional loop type directional antenna; however, yagi beams or other directional antennas may be used depending on the beacon's operating frequency. An automatic alarm might be used to alert a search crew when in the range of a shopping cart; or the crew may monitor the receivers output, listening for the "beeping" sound generated by the shopping cart beacon transmitter.

The power system for the VHF beacon radio transmitter would be conventional batteries. It should also be understood that if it were so desired, rechargeable batteries could be used.

In actual use of the novel shopping cart retrieval system, it would be possible to assign each grocery store chain a unique beacon frequency. Hence a search crew with a scanning receiver programed for each of these frequencies could recover carts belonging to stores they have recovery contracts with.

There can be various packaging configurations accommodating the different types of cart handles in which the transmitter can be secured.

DESCRIPTION OF THE PREFERRED EMBODIMENT

Applicant's novel shopping cart retrieval system will now be described by referring to FIGS. 1-7 of the drawings. The shopping cart retrievel system consists of two distinct units of electronic equipment, namely the radio transmitter 10 and the radio receiver 12.

Figure 2:
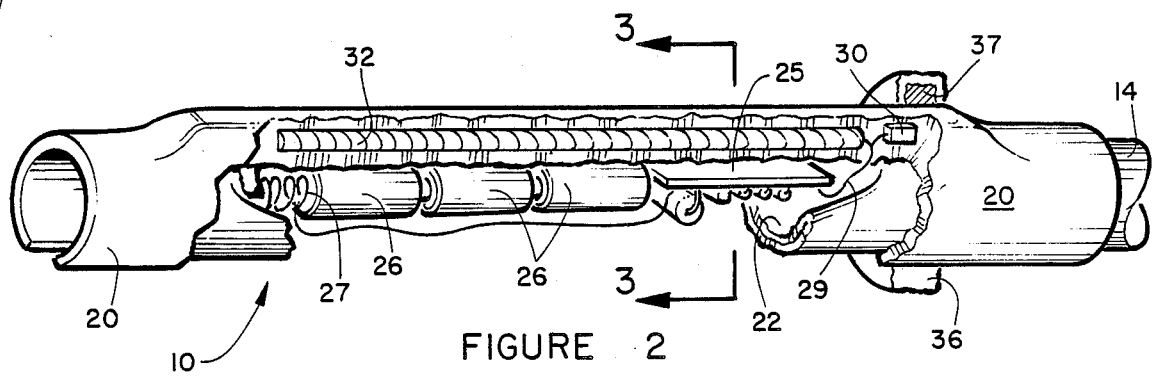
FIG. 2 is an enlarged view of the handle of the shopping cart with portions broken away to illustrate the components mounted therein.

Radio transmitter assembly 10 is implanted in handle 14 of a shopping cart 16. The specific structure of radio transmitter assembly 10 is best illustrated in FIG. 2. A molded plastic housing 20 formed in the shape of a handgrip is detachably mounted on the handle 14 of the shopping cart. Portions of the handle 14 have been crimped or compressed as at 22 to form a chamber that is covered by housing 20. Batteries 26 have a spring loaded negative contact 27 positioned at their one and a positive contact 28 at their other end. Contact 27 would be connected to the printed circuit board 25 and contact 28 is connected by conductor member 29 to a magnetic reed switch 30. Helical antenna 32 is electrically connected to magnetic reed switch 30. Plastic collar 36 having a magnet 37 thereon is snapped onto housing 20 over top of magnetic reed switch 30, and when this is done the electrical circuit it broken and the radio transmitter shuts down.

Figure 1:
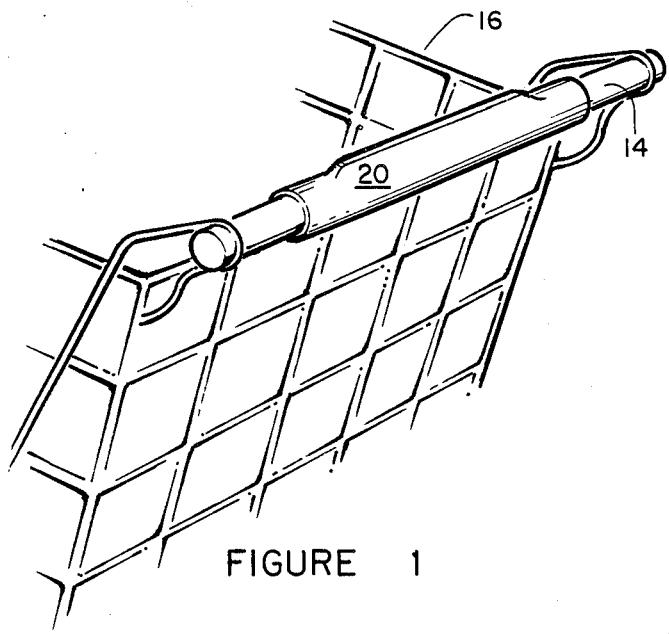
FIG. 1 is a perspective view illustrating applicant's novel handle housing with the radio transmitter unit mounted in the handle of a shopping cart.
Figure 3:
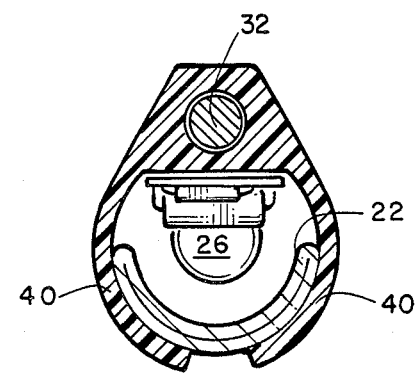
FIG. 3 is a cross-sectional view taken along lines 3—3 of FIG. 2.

The cross section of housing 20 is illustrated in FIG. 3. It shows that helical(load type) antenna 32 is encapsulated in the plastic material. Also housing 20 has a pair of fingers 40 that snap over the crimped portion of handle 14. Printed circuit board 42 is illustrated as being insulated from antenna 32.

Figure 5:
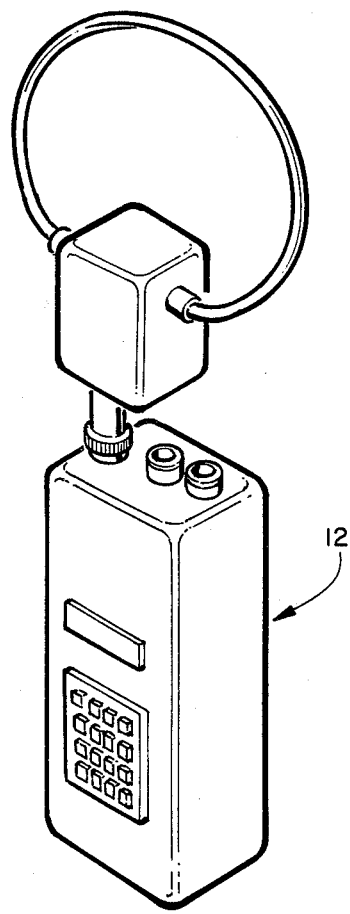
FIG. 5 illustrates the scanning VHF receiver.

The electrical circuit for the radio transmitter 10 is illustrated in FIG. 5. Contact 28 of battery 26 is connected by wire 29 to a reed switch 30 which is in turn connected to ground. Contact 27 is connected to resistor R1 which connected to the clock portion 44 of the circuit and also to quad nand gate Q1. Clock portion 44 has a capacitor C1 that is connected to parallel resistors R2 and R3 that are respectively connected to Quad nand gates Q2 and Q3. Resistor R4 is connected to ground and also the input of Quad nand gate Q4 whose output is connected to the input of Quad nand gate Q1. The output of Quad nand gate Q1 passes through capacitor C2 and R5 and is input into transitor T1. The output of transistor T1 passes through resistor R6 and through capacitor C3 and coupling coil 46 that are in parallel. A crystal 48 and resistor R7 both of which are grounded are connected to transitor T2. One of the outputs of transistor T2 is connected through resistor R8 to ground. The output of coupling coil 46 is connected through capacitor C4 and filter coil 49 to antenna 32.

An omni directional receiver 12 is illustrated in FIG. 5. It would normally be installed in the recovery vehicle but would be removable for hand-operation and would have a range of approximately 500 feet.

Figure 4:
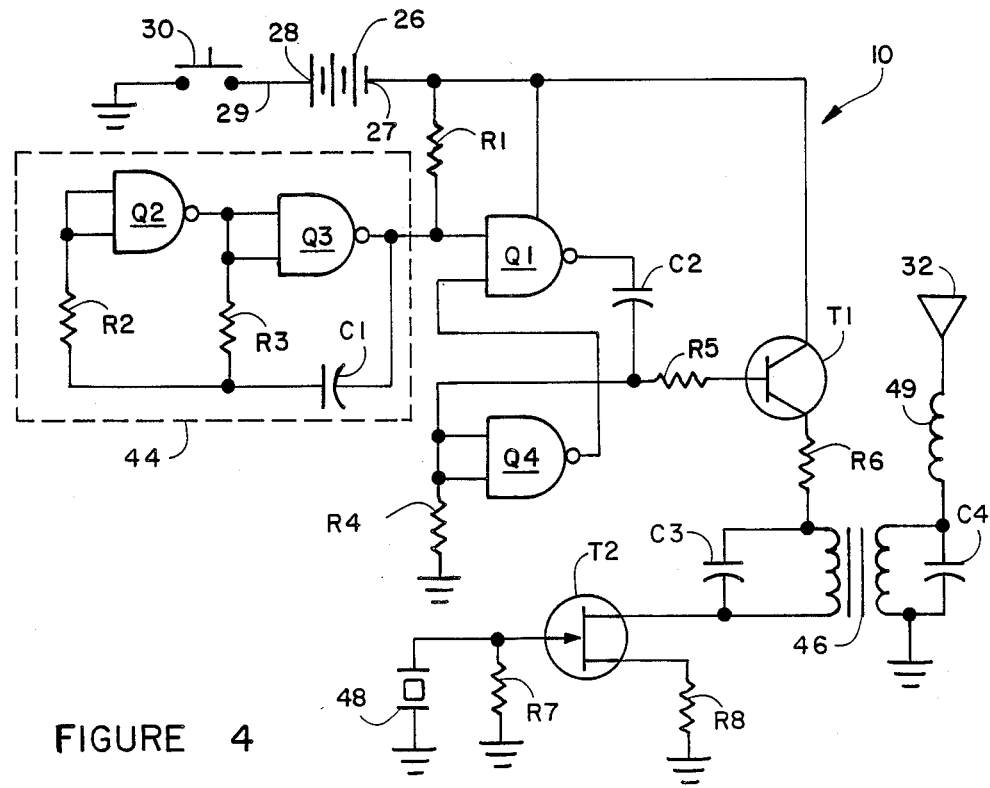
FIG. 4 is a circuit diagram of the beacon radio transmitter.
Figure 6:
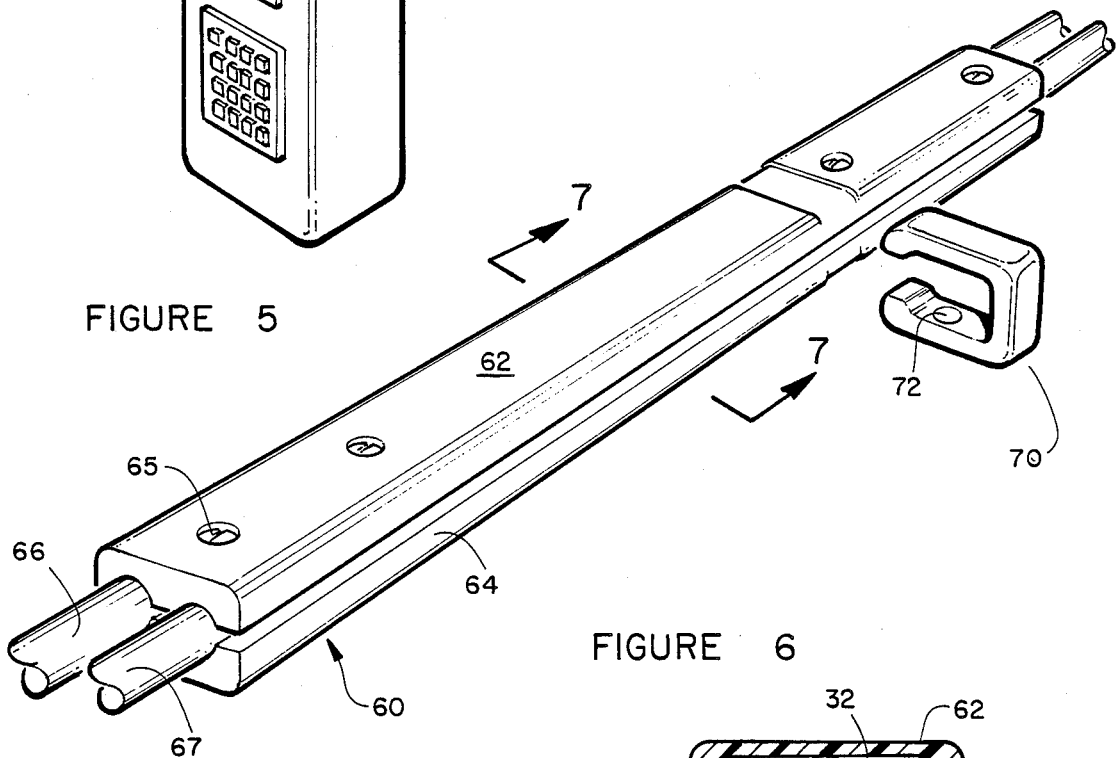
FIG. 6 illustrates another type of shopping cart handle housing with applicant's novel radio transmitter assembly mounted in a first alternative handle housing.
Figure 7:
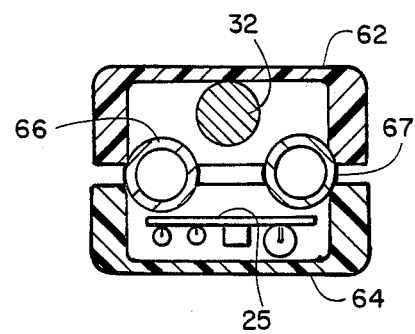
FIG. 7 is a cross sectional view taken along lines 7—7 of FIG. 6.

The first alternative molded plastic housing 60 is illustrated in FIG. 6. It is comprised of a top half 62 and a bottom half 64 that are fastened to each other by screws 65. The top half 62 and bottom half 64 would be sandwiched around transversly extending handle rod members 66 and 67. A plastic collar 70 having a magnet 72 therein is snapped onto housing 60 over top of magnetic reed switch 30 such as found in the circuitry illustrated in FIG. 4. When this is done the electrical circuit is broken and the radio transmitter shuts down. As seen in FIG. 7, the same electrical circuit as seen in FIG. 4 is contained in housing 60.

What is claimed is:

1. A shopping cart retrieval system comprising:
   a shopping cart having a handle;
   a radio transmitter asembly having a radio transmitter;
   means for attaching said radio transmitter assembly to said shopping cart comprising an elongated plastic housing that snaps on the shopping cart handle, said radio transmitter assembly being mounted in said housing; and
   means for activating and de-activating said radio transmitter.

2. A shopping cart retrieval system as recited in claim 1 wherein said radio transmitter is of a VHF beacon type.

3. A shopping cart retrieval system as recited in claim 1 wherein said radio transmitter assembly is mounted on the handle of a shopping cart.

4. A shopping cart retrieval system as recited in claim 1 wherein said radio transmitter assembly has an antenna in its circuit and said antenna is located entirely within said plastic housing and completely hidden from view.

5. A shopping cart retrieval system as recited in claim 4 wherein said antenna is of the helical(loaded type) type which gives it additional electrical length compared to its actual length.

6. A shopping cart retrieval system as recited in claim 1 wherein said radio transmitter assembly has an electrical circuit having a magnetic on/off switch that is activated and deactivated by a magnet mounted on a collar that snaps on to the exterior of said plastic housing adjacent said magnetic switch which itself is mounted in the interior of said housing.

7. A shopping cart retrieval system as recited in claim 1 further comprising a VHF radio receiver with an omni-direction antenna for detection of the shopping cart at a maximum range and a directional antenna used for the close-in location process.

8. A radio transmitter assembly as recited in claim 6 wherein said switch is a reed switch.

9. A shopping cart retrieval system comprising:
   a shopping cart having a handle;
   a radio transmitter assembly having a radio transmitter;
   means for mounting said radio transmitter assembly on the handle of said shopping cart comprising an elongated plastic housing having a top half and a bottom half that are secured to each other by fasteners and which has the transmitter assembly mounted therein; and
   means for activating and de-activating said radio transmitter.

* * * * *